United States Patent
Humphrey et al.

(10) Patent No.: US 10,020,737 B1
(45) Date of Patent: Jul. 10, 2018

(54) PLURALITY OF CONVERTERS EXTENDING DUTY CYCLE BY CHECKING VOLTAGE THRESHOLDS

(71) Applicant: Hewlett Packard Enterprise Development LP, Houston, TX (US)

(72) Inventors: Daniel Humphrey, Houston, TX (US); Mohamed Amin Bemat, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/383,346

(22) Filed: Dec. 19, 2016

(51) Int. Cl.
*H02M 3/158* (2006.01)
*H02M 3/07* (2006.01)

(52) U.S. Cl.
CPC .... *H02M 3/1584* (2013.01); *H02M 2003/071* (2013.01); *H02M 2003/1586* (2013.01)

(58) Field of Classification Search
CPC ........... H02M 3/158–3/1588; H02M 2003/071
See application file for complete search history.

(56) References Cited

U.S. PATENT DOCUMENTS

| 5,926,383 A * | 7/1999 | Pilukaitis | H02H 7/1213 361/18 |
|---|---|---|---|
| 6,525,435 B2 | 2/2003 | Lau et al. | |
| 9,281,761 B2 | 3/2016 | Wagoner et al. | |
| 9,350,248 B2 | 5/2016 | Kumada | |
| 2009/0212758 A1* | 8/2009 | Asinovski | H02M 1/10 323/355 |
| 2010/0066171 A1 | 3/2010 | Thakur et al. | |
| 2011/0012574 A1* | 1/2011 | Lish | H02M 3/1584 323/282 |
| 2014/0320101 A1* | 10/2014 | Fishelov | H02M 3/157 323/283 |
| 2015/0244280 A1* | 8/2015 | Andersson | H02J 3/36 363/35 |

FOREIGN PATENT DOCUMENTS

CN   105119486 A   12/2015

OTHER PUBLICATIONS

Benavides, N.D. et al., "Power Budgeting of a Multiple-Input Buck-boost Converter," (Research Paper), IEEE Transactions on Power Electronics 20.6, Nov. 7, 2005, pp. 1303-1309.
Li, Y. et al., "A Novel Buck/boost/buck-boost Three-input DC/DC Converter," (Research Paper), IECON 2011—27th Annual Conference on IEEE Industrial Electronics Society, Nov. 7 10, 2011 3 pages.

* cited by examiner

*Primary Examiner* — Gary L Laxton
*Assistant Examiner* — Peter Novak
(74) *Attorney, Agent, or Firm* — Hewlett Packard Enterprise Patent Department

(57) ABSTRACT

An example device in accordance with an aspect of the present disclosure includes a first converter to selectively convert a first input signal to a first output signal, and a second converter to selectively convert a second input signal to a second output signal. A controller is to control switches of the first and second converters based on the input signals and output signals, and based on operating the first and second converters exclusively with respect to each other such that a total of first and second duty cycles does not exceed one.

13 Claims, 6 Drawing Sheets

PLURALITY OF CONVERTERS EXTENDING DUTY CYCLE BY CHECKING VOLTAGE THRESHOLDS

BACKGROUND

Many different types of input power, with varied utility voltages and frequencies, can be available at a given site, for powering computing systems. Power factor correcting converters can be used to convert input power to provide usable power to computing systems, such as racks of servers. However, the variation in the input power sources to be converted can pose challenges, and risk exposing computing systems to large potential differences in voltage, e.g., between multiple power factor correcting converters. Such large potentials can vary with time and make control difficult.

DETAILED DESCRIPTION

Power converters include non-isolated power factor correcting converters, which are associated with additional challenges when paralleling such converters for use with separate inputs. Although isolated converters can be used, they are associated with increased cost, reduced efficiency, and being physically larger than non-isolated converters. To increase potential applicability to various different installation scenarios and available power sources to be converted, example power converters can be designed to support isolated or non-isolated voltage and/or phase relationships that may be encountered in deployment. Accordingly, a customer can use such example converters with a wide variety of sources.

In addition to large potential voltage/power differences between two power sources to be converted at a given site, there are often common nodes between utility inputs. Such situations pose additional challenges to power converters, because traditional power factor correcting converters cannot control return current (which can return through either of the parallel converters). This greatly complicates current sensing and makes infrastructure sizing extremely difficult, which may impose a need to over-size the power converters by a factor of two, at increased expense. Furthermore, power converters may not provide sharing between modules, limiting the number of customers willing to adopt such power converter solutions. Additionally, transfers between power sources when failures occur can cause large transients, leading to a need for elaborate control and sensing, and additional complexity for storing much more energy to allow transition between such sources.

To address such issues, example implementations described herein can handle the high potentials and uncontrolled return currents, while power factor correcting and input power sharing. This enables the paralleling of non-isolated alternating current (AC) power sources of different worldwide datacenter voltages. An example implementation accordingly can serve as a universal source parallel non-isolated buck-boost power factor correcting converter system.

Example implementations, such as the non-isolated power factor correcting buck-boost converter, are capable of sharing between two power sources while accommodating natural inrush current control with the bucking ability of the converter. Example implementations can include the ability to buck, which reduces voltage rating needs of the output converter(s). This improves efficiency and reduces costs of the output converter(s). Example converters can operate in buck and/or boost modes, enabling production of output voltages that can be above or below the input voltage(s), while providing sufficient holdup to accommodate when an input power source fails (increasing the output voltage to a level suitable for hold up).

Figure 1:
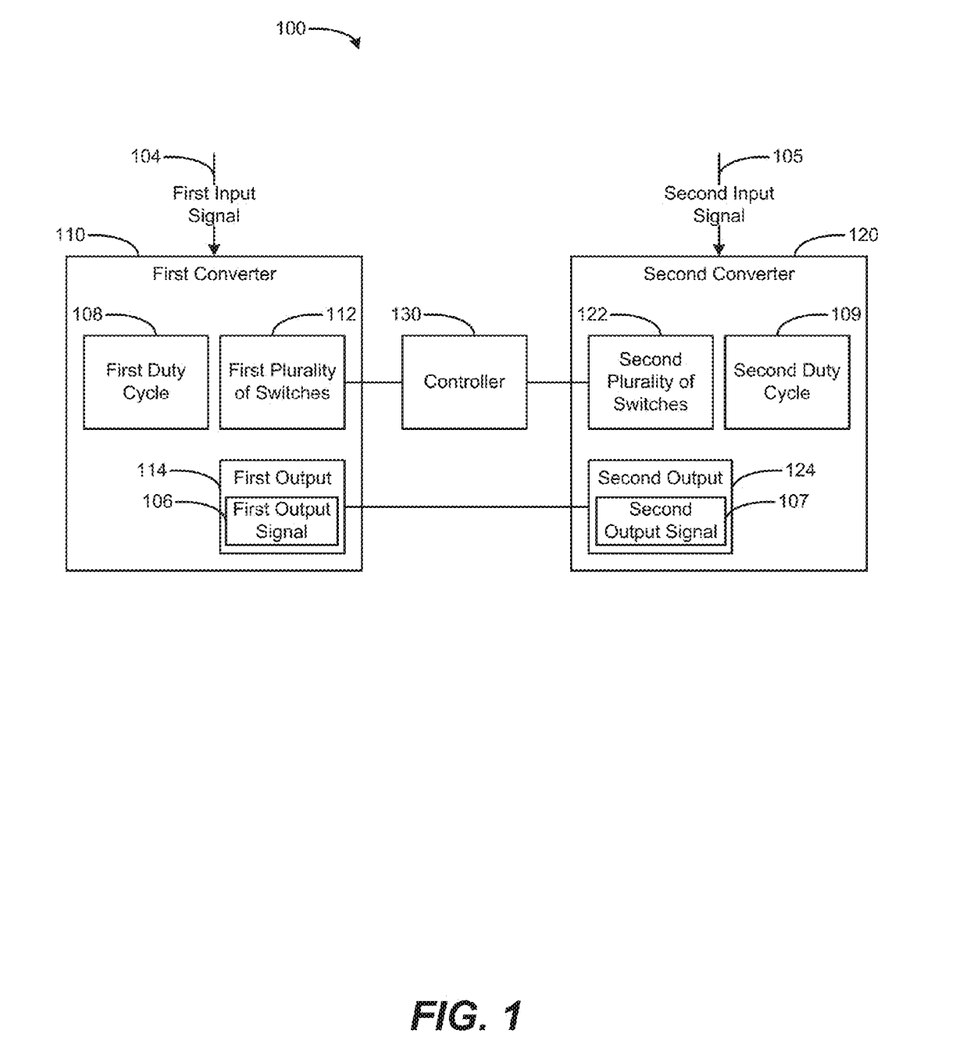
FIG. 1 is a block diagram of a power converter including a first converter, a second converter, and a controller according to an example.

FIG. 1 is a block diagram of a power converter 100 including a first converter 110, a second converter 120, and a controller 130 according to an example. The first converter 110 is to selectively convert a first input signal 104 to a first output signal 106 based on a first plurality of switches 112 and a first duty cycle 108. The second converter 120 is to selectively convert a second input signal 105 to a second output signal 107 based on a second plurality of switches 122 and a second duty cycle 109. A first output 114 of the first converter 110 is coupled to a second output 124 of the second converter 120. The controller 130 is to control the first and second plurality of switches 112, 122 based on the first and second input signals 104, 105 and the first and second output signals 106, 107. The controller 130 is to operate the first and second converters 110, 120 exclusively with respect to each other such that a total of the first and second duty cycles 108, 109 does not exceed one (i.e., 100%).

The power converter 100 can be based on a topology to fully rectify input AC waveform(s) that may be provided as the first and second input signals 104, 105. The power converter 100 can operate as a switching converter, in a buck mode or a boost mode. For a given one of the first converter 110 and second converter 120, if the potential of the rectified corresponding first/second input signal 104, 105 is below a voltage of the output signal (the first output 114 being coupled to the second output 124), the converter operates in a boost mode. If the rectified input voltage is above the output voltage, the corresponding converter can operate in a buck mode. The input voltage can be rectified based on a rectifier (not shown in FIG. 1; see FIGS. 3 and 4), which can be a half-bridge or full-bridge rectifier that serves as an AC/DC converter in itself, as part of the overall power converter. The first converter 110 can include a rectifier and/or the second converter 120 can include a rectifier. In an example implementation, the first and second rectifiers can be provided as passive full-bridge rectifiers. The first and second plurality of switches 112, 122 can be provided as metal-oxide semiconductor field-effect transistors (MOSFETs), junction FETs, insulated-gate bipolar transistors (IGBTs), power transistors, or the like.

The controller 130 can check various conditions regarding input/output signals 104, 105, 114, 124, and/or duty cycles 108, 109, and adjust the switches 112, 122 accordingly to provide desired output signals 106, 107. In an example implementation, the first input signal 104 may be relatively higher in voltage value to the desired first output signal 106, allowing for the first output signal 106 to be reached relatively sooner. Accordingly, the controller 130 can identify a first unneeded portion of operational time of the first duty cycle 108, based on checking whether the first output signal 106 has reached a first threshold prior to the end of the first duty cycle 108. Thus, because the first output 114 threshold has been reached, no further time is needed by the first converter 110, and the controller 130 can adjust the first plurality of switches 112 to end the first duty cycle 108 of the first converter 110, and begin the second duty cycle 109 of the second converter 120. Thus, the controller 130 is to extend the second duty cycle 109 by adding the first unneeded portion of operational time to the second duty cycle 109, and transition from the first duty cycle 108 to the second duty cycle 109. Because the controller 130 can sense the first and second input signals 104, 105 and the first and second output signals 114, 124, the controller 130 can control the first and second plurality of switches 112, 122 and operate the first and second converters 110, 120 to use an appropriate share of the total time for the first and second duty cycles 108, 109. Such control can be provided for either of the first and second converters 110, 120.

The first and second converters 110, 120 can be operated according to a boost mode or a buck mode. For consistency of explanation, the mode of operation of the first converter 110 will be referred to as a first mode (which can be a buck mode or a boost mode), and the mode of operation of the second converter 120 will be referred to as a second mode. The controller 130 can choose the first mode of the first converter 110 (whether boost or buck), and the second mode of the second converter 120 (whether boost or buck), according to the sensed first and second input and output signals. For example, in a given converter, the controller 130 can operate that converter in boost mode when a desired voltage of its output signal is greater than the voltage of its input signal. Thus, the first mode of the first converter 110 would be boost mode. The controller 130 can operate that converter in buck mode when a desired voltage of its output signal is less than the voltage of its input signal. Thus, the first mode of the first converter 110 would be buck mode.

The power converter 100 provides redundant operation by virtue of the first and second converters 110, 120. The controller 130 can identify a loss of either the first input signal 104 or the second input signal 105 (e.g., based on an invalid input signal value, such as zero voltage), and in response, remove a duty cycle limit from a corresponding remaining one of the first and second converters 110, 120 still receiving its input signal. Thus, the power converter 100 can continue providing output if one of the inputs fails, automatically, based on the controller 130. Additionally, in response to loss of one of the inputs, the controller 130 can increase output voltage of the remaining converter to a level suitable for providing a full holdup time. The holdup time is provided as an ability of the power converter 100 to serve as a momentary energy storage device, to allow the converter 100 to continue providing output if the input is lost or suffers anomalies (e.g., to accommodate a loss of input for ten or twenty milliseconds, which would be enough time to provide output energy for an offline/standby Uninterrupted Power Supply (UPS) to take over).

Accordingly, the first and second converters 110, 120 of the power converter 100 can operate as non-isolated converters, enabling them to be connected to available worldwide sources that a customer may have onsite. Sources may be provided by independent utilities, at different frequencies, phases, and or voltages (e.g., 50-60 Hz, 100-240 volts Root Mean Square (RMS), at any phase relationship with each other, regardless of whether they have common neutrals, common line connections, or the like. The power converter 100 is thus beneficial for use with server/storage/network or other information technology (IT) equipment, as well as other applications that involve the consumption of power, particularly where redundancy in power delivery is valued.

Figure 2:
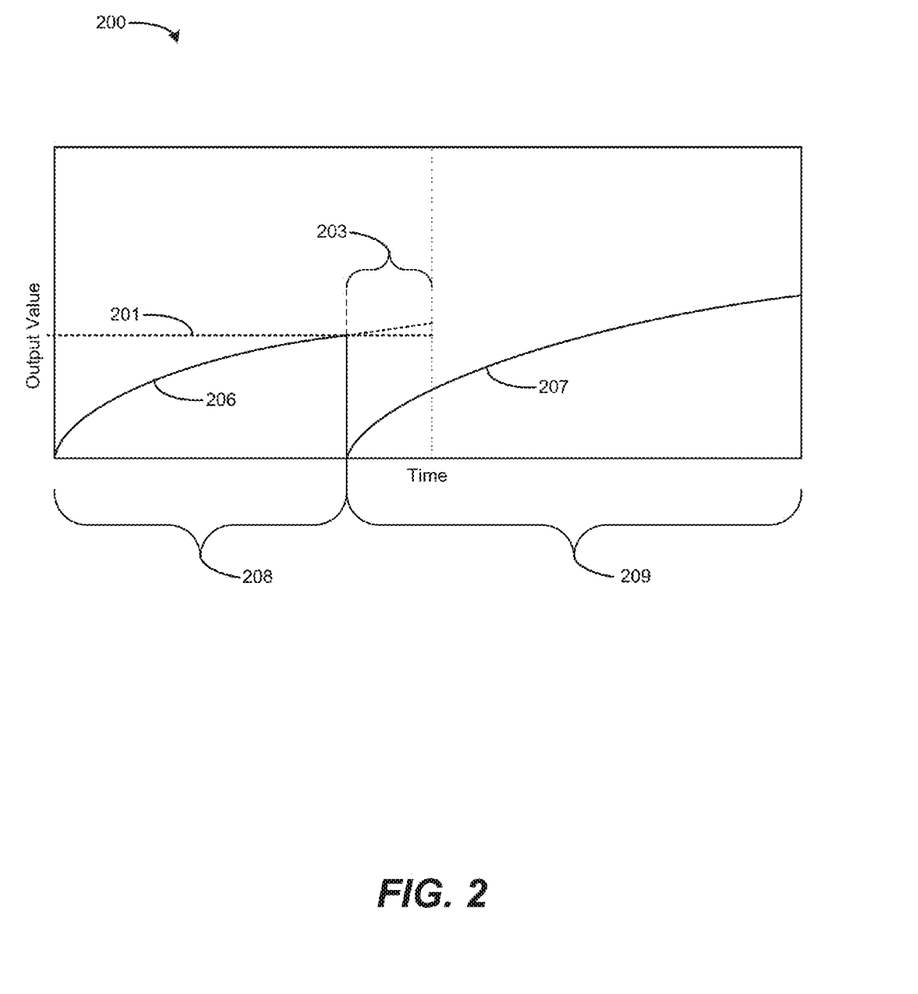
FIG. 2 is a chart of a first duty cycle corresponding to a first converter, and a second duty cycle corresponding to a second converter, according to an example.

FIG. 2 is a chart 200 of a first duty cycle 208 corresponding to a first converter, and a second duty cycle 209 corresponding to a second converter, according to an example. The example chart 200 illustrates first and second converters operating their respective first and second modes, whereby the first output signal 206 rises in value over time during the first duty cycle 208 of the first mode, and the second output signal 207 rises in value over time during the second duty cycle 209 of the second mode. Notably, the first output signal 206 has reached an acceptable first threshold 201 early, with some remaining unneeded portion 203 of the first duty cycle 208. Accordingly, that time is devoted to extending the second duty cycle 209, allowing the second output signal 207 to reach a higher value.

A controller (e.g., controller 130 of FIG. 1) can identify a mode of operation for a given converter, and maximize the duty cycle available for each converter based on that mode of operation. For example, if one input signal is at 400 Volts (V) for a given converter, and the desired output is at 200 V, then that converter would need on the order of a 25% duty cycle to achieve the conversion reducing the voltage. Accordingly, 75% of the available period in the switching period for that converter's duty cycle is available for the other converter to use. Such shifting of duty cycles can be adjusted further, e.g., whether a given converter is operating in boost mode or buck mode. The controller can determine, cycle by cycle, how to provide as much of the unneeded portion 203 of a given duty cycle to the other converter. Furthermore, the controller can synchronize switches of both converters such that they are operating exclusively with respect to each other.

The example thresholds, to which converter output can be compared, can be determined by the controller based on the desired output in view of the available duty cycle, period, and/or mode. The thresholds also can be set as part of design constraints on the converters, and can be specified by a user. In an example implementation, the controller can identify the threshold as an amount of time sufficient to achieve a given output voltage and/or current.

The overall duty cycle, as represented by the full width of the chart 200, cannot exceed 1 between the two converters (the duty cycle of both converters added together does not exceed 100%). Therefore, in operating the pair of converters in a combination of modes, it may be that neither converter needs more than 50% duty cycle, such that the sum of the two duty cycles does not exceed 1, and the controller does not need to impose constraints on either controller's duty cycle usage, and the controller can operate the first and second switching converters exclusively with respect to each other (e.g., ensuring that the first and second converters are controlled out of phase with one another, such that one converter does not start until the other converter is off). More specifically, for a given set frequency, one converter can be given half of the time in the illustrated time window (1/switching frequency), and the other converter can be given the other half, for this example operational mode. In contrast to such a mode, the illustrative example of FIG. 2 shows the first converter on the left using less than half of the total time, with additional time given to the second converter on the right.

The more duty cycle that the controller gives to a converter that is operating in boost mode, the better the quality of the output signal current. As shown in FIG. 2, the second converter is boosting for more than its normal 50% duty cycle window, based on the using the unneeded portion 203 from the first converter. The controller can use feedback from the first converter or second converter, to adjust duty cycle of the first or second converter. If operating in buck mode, where output is at a lower voltage than input, a given controller can finish before needing half of the duty cycle. This is communicated to the controller (e.g., by monitoring that converter's output relative to a threshold 201), which identifies that remaining time of the duty cycle for that switching period can be given to the other converter, if needed.

The controller can control a converter based on feedback (e.g., the output has reached sufficient threshold value to allow the converter to turn off), and/or based on a time limit (e.g., a given converter using its allotted time, under the constraint of operating the switching converters exclusively of one another). The controller can identify the operational time remaining based on various factors, such as whether the first output signal has reached a first threshold prior to the end of the first duty cycle, or whether the second output signal has reached a second threshold prior to the end of the second duty cycle. This is shown in FIG. 2, where the controller has identified the first unneeded portion 203 of operational time of the first duty cycle 208 based on checking whether the first output signal 206 has reached a first threshold 201 prior to the end of the first duty cycle 208. The controller has accordingly extended the second duty cycle 209 by adding the first unneeded portion 203 of operational time to the second duty cycle 209, and has transitioned from the first duty cycle 208 to the second duty cycle 209 prior to the midway point in time. In another example implementation, the controller could similarly use such an approach to grant time from the second duty cycle 209 to the first 208. For example, the controller can identify a second unneeded portion of operational time of the second duty cycle based on checking whether the second output signal has reached a second threshold prior to the end of the second duty cycle, and extend the first duty cycle by adding the second unneeded portion of operational time to the first duty cycle, then transition from the second duty cycle to the first duty cycle. The controller can take other factors into account, such as in what type of mode (boost or buck) a given converter is operating, or in what types of modes both of the converters are operating and how those modes interact with each other in terms of optimizing use of the total duty cycle.

Figure 3:
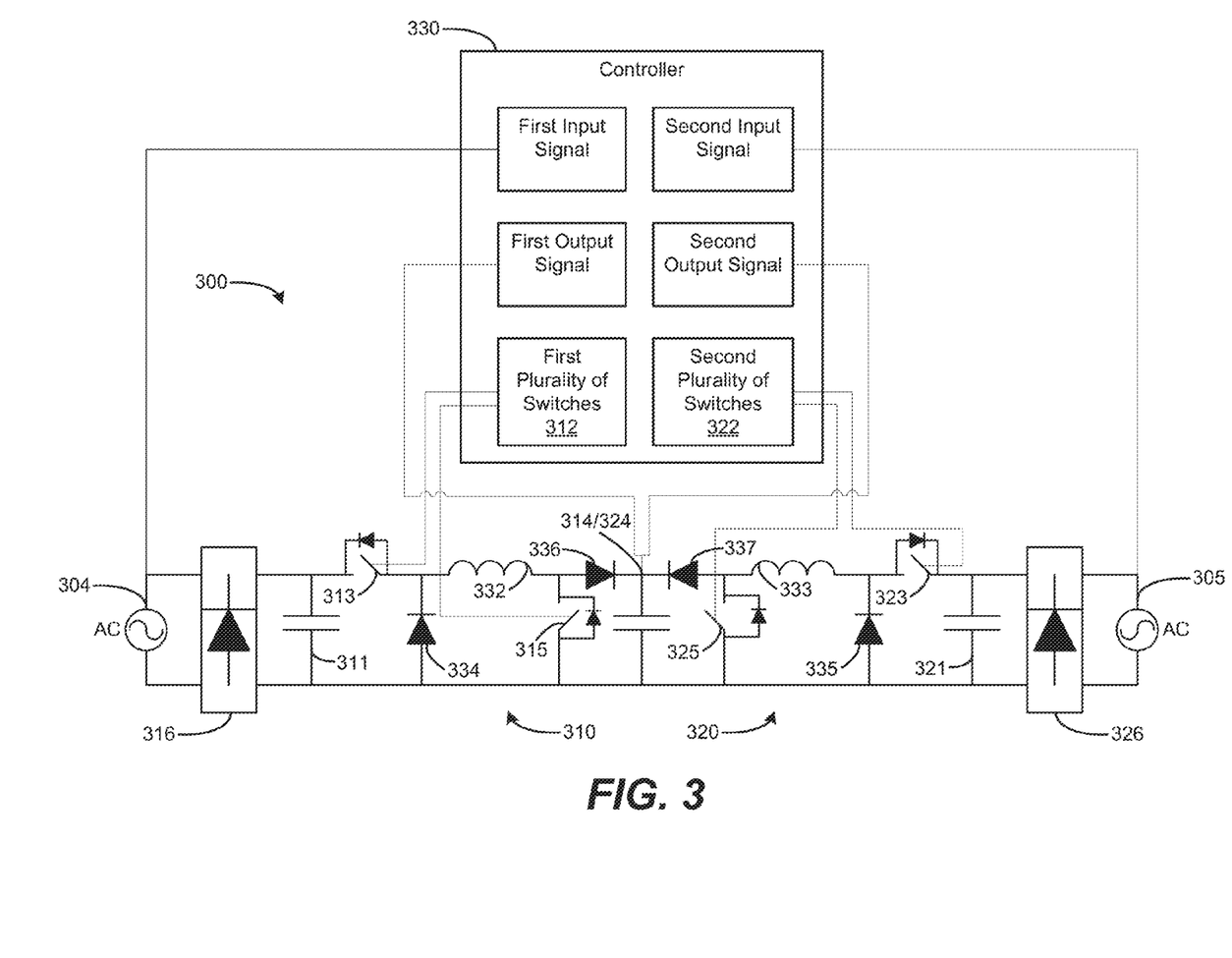
FIG. 3 is a block diagram of a controller, and a circuit diagram of a power converter including a first converter and a second converter, according to an example.

FIG. 3 is a block diagram of a controller 330, and a circuit diagram of a power converter 300 including a first converter 310 and a second converter 320, according to an example. The controller 330 is to identify the first input signal 304, second input signal 305, first output signal 314, second output signal 324, and operate the first plurality of switches 312 and the second plurality of switches 322.

The first input signal 304 is coupled to the first rectifier 316, which provides rectified input to a first capacitor 311, first inductor switch 313, first inductor diode 334, first inductor 332, first output diode 336, and first output 314. The first plurality of switches 312 includes a first inductor switch 313 to selectively isolate, from the first input signal 304, a first inductor 332 of the first converter 310. The first plurality of switches 312 also includes a first output switch 315 to selectively isolate the first inductor 332 from the first output 314.

The second input signal 305 is coupled to the second rectifier 326, which provides rectified input to a second capacitor 321, second inductor switch 323, second capacitor 321, second inductor diode 335, second inductor 333, second output diode 337, and second output 324. The second plurality of switches 322 includes a second inductor switch 323 to selectively isolate, from the second input signal 305, a second inductor 333 of the second converter 320. The second plurality of switches 322 also includes a second output switch 325 to selectively isolate the second inductor 333 from the second output 324. The controller 330 is to prevent the first inductor switch 313 and the second inductor switch 323 from being closed simultaneously. The load is represented by a capacitor at the first and second outputs 314/324, and could also be represented by a resistor or other analogue.

The controller 330 can operate the first converter 310 (and/or the second converter 320, with reference to appropriate corresponding components of the second converter 320) in a buck mode and/or boost mode. To operate the first converter 310 in boost mode, the controller 330 closes first inductor switch 313 and first output switch 315 to charge the first inductor 332. The controller 330 then opens the first output switch 315 to force current to the output load (shown as a capacitor). The controller 330 can identify that the first mode is to be a boost mode based on a rectified potential of the first input signal 304 being below a voltage of the first output signal 314, and accordingly close the first inductor switch 313 and the first output switch 315 to charge the first inductor 332 during the first duty cycle and open the first output switch 315 and the second output switch 325 to direct the output signal to the first and second output 314/324 during the first duty cycle. Alternatively, the controller can open both switches 313 and 315, and allow the inductor to freewheel through diode 334 and isolate from the source, similar to buck mode.

To operate the first converter 310 (and/or the second converter 320) in buck mode, the controller 330 closes the first inductor switch 313 to direct the first input signal 304 through the first rectifier 316, first inductor switch 313, first inductor 332, first output diode 336, through the load (indicated as a load capacitor), and back out through the bottom side of the first converter 310. After an appropriate duration (corresponding to the duty cycle, ratio of input to output values, and/or other factors for buck mode), the controller 330 opens the first inductor switch 313, enabling the stored energy to freewheel through the first inductor diode 334 to continue discharging from the first inductor 332. The controller 330 can determine the mode of a given controller (e.g., first controller 310, for example) as being a buck mode, based on identifying that a rectified potential of the first input signal 304 is above the voltage of the first output signal 314. In response, the controller can operate the first plurality of switches 312 for that converter, to close the first inductor switch 313 and open the first output switch 315 to feed the first and second output 314/324 during the first duty cycle and open the first inductor switch 313 to isolate the first inductor 332 from the first input signal 304 and allow the output signal 314/324 to freewheel through a first inductor diode 334 during the first duty cycle.

The second converter 320 can perform similar modes as described above with respect to the first converter 310. For example, the controller is to identify the second mode as a boost mode based on a rectified potential of the second input signal 305 being below a voltage of the second output signal 324, and close the second inductor switch 323 and the second output switch 325 to charge the second inductor 333 during the second duty cycle and open the second output switch 325 and the first output switch 315 to direct the output signal to the first and second output 314/324 during the second duty cycle. The controller 330 is to identify the second mode as a buck mode based on a rectified potential of the second input signal 305 being above the voltage of the second output signal 324, and close the second inductor switch 323 and open the second output switch 325 to feed the first and second output 314/324 during the second duty cycle and open the second inductor switch 323 to isolate the second inductor 333 from the second input signal 305 and allow the output signal 324 to freewheel through the second inductor diode 335 during the second duty cycle.

Figure 4:
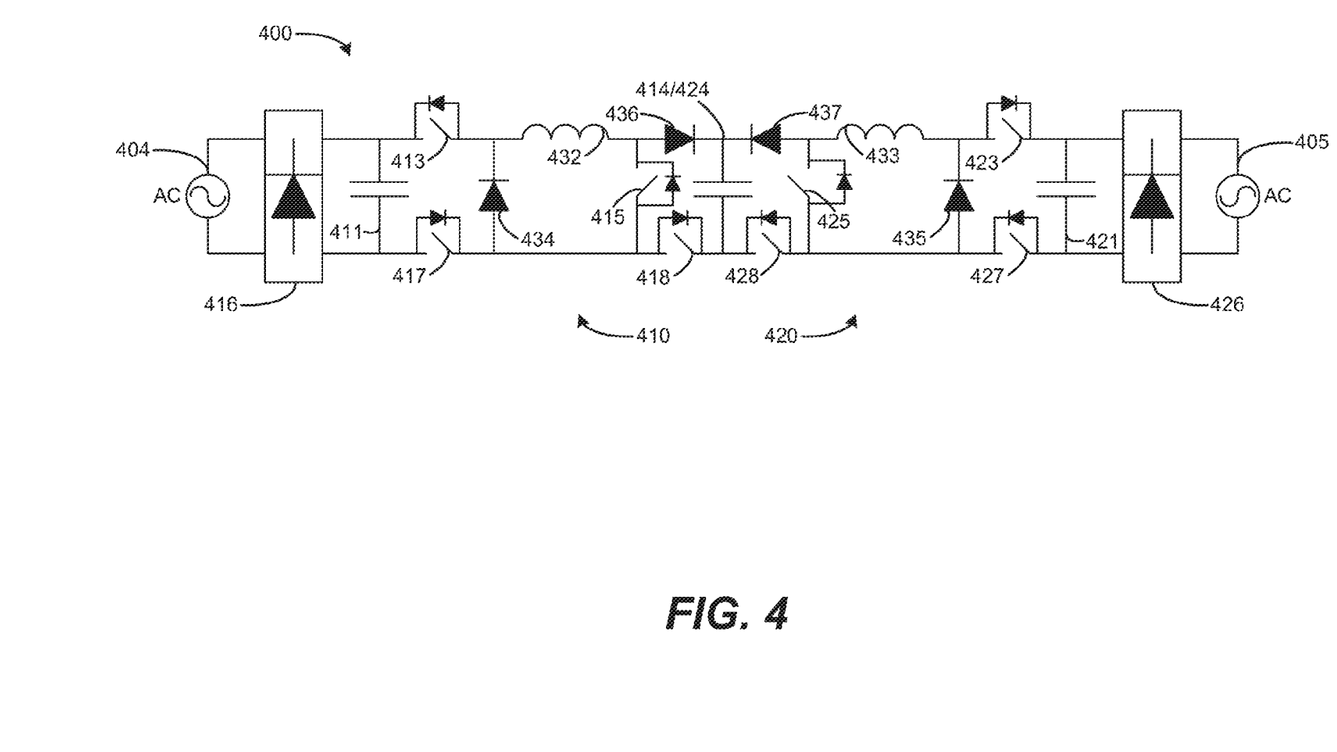
FIG. 4 is a circuit diagram of a power converter including a first converter and a second converter according to an example.

In the example implementation illustrated in FIG. 3, the bridge rectifiers (first rectifier 316 and second rectifier 326) prevent current from circulating through the high side of the power converter 300. However, the low side of the power converter 300 does not include components to prevent current from circulating between the first and second sources 305, 306 through the low side of the rectifier(s). If the first and second sources 305, 306 are from two delta-isolated sources, the isolation of the first and second sources 205, 206 prevents issues from arising, and control is straightforward because no current path exists between the first and second sources 205, 206. However, it is not possible to guarantee that users will use delta-isolated sources. In contrast, it is possible the users will use sources that might share a common neutral, or include connections between neutrals and ground. Accordingly, the example circuit topology of FIG. 3 can be modified (e.g., as shown in FIG. 4 and discussed later), to incorporate components to prevent current from circulating through the low side.

The controller 330 is shown as a single component, and may be provided as one or more controllers. For example, a first controller can monitor output voltage(s), a second controller can monitor input current(s), a third controller can track states of the various switches and which to switch next, and so on. Such a plurality of controllers is represented in FIG. 3 as the single controller 330. The controller 330 can monitor input voltage, and depending on the value of the output voltage, the controller 330 can operate the switches for a given controller according to a buck mode or boost mode. Thus, the controller 330 can monitor input and output voltages at any given time to determine switching. The controller 330 can monitor current feedback and voltage feedback for timing the on and/or off times of switches.

The controller can use rules of precedence for the different switches/states to avoid instability, and adjust various control functions used with the power converter 300. Control functions can include power factor correcting the first input signal 304, power factor correcting the second input signal 305, managing a voltage level of the first/second output 314/324, regulating output voltage, ensuring exclusivity between first inductor switch 313 and components to prevent low side circulation in the second converter (see switches 427 and 428 of FIG. 4), and ensuring exclusivity between second inductor switch 323 and components to prevent low side circulation in the first converter (see switches 417 and 418 of FIG. 4). In an example control scheme, highest priority can be given to ensuring switch exclusivity, followed by power factor correction, followed by voltage regulation. Such control functions can be centralized or spread out across multiple controllers.

Because the first converter 310 can be operated in two different first modes (boost or buck), and the second converter 320 can be operated in two different second modes (boost or buck), the controller can use a switching scheme having four overall modes of operation: 1) buck, buck; 2) buck, boost; 3) boost, buck; and 4) boost, boost. In overall mode 1), neither converter needs more than 50% duty cycle, so no added control measures (to satisfy control function rules of precedence) are needed beyond keeping the first and second converters 310, 320 exclusive (e.g., at the same frequency and 180 degrees out of phase). In overall modes 2), 3), and 4), exclusivity and duty cycle sharing is needed, due to at least one converter operating in boost mode. The controller 330 therefore can control the power converter 300 by determining what mode a given converter 310, 320 is in (e.g., which combination of buck and/or boost), and depending on what mode(s), adjust the switching of the various switches, to maximize available duty cycle (e.g., provide additional duty cycle for that converter, if applicable, operating in boost mode).

The voltage level of the outputs 314/324 can be controlled to alter the time operating in each of the different modes. The higher the output voltage level, the longer each converter is in boost mode. For connections that are nearly in phase, lowering such voltage to a minimum can maximize the power quality. However, lower voltages can generally hinder meeting holdup requirements. Yet, because holdup energy is not fully needed until one of the input sources is lost, the power converter 300 can be operated at lower voltages to minimize or even eliminate operation according to overall mode 4) boost, boost. Given such possibility, at the time of a loss of one input source, any duty cycle limit on the remaining converter can be lifted. Thus, increasing the voltage at such time to a level suitable for full holdup time is achievable.

Inrush current can be handled by the example power converter 300 by soft starting, e.g., in a similar manner as a buck converter. This saves cost, compared to some boosting-only converters that would need additional current limiting components. If the output voltage needed is low enough in value, the example power converter 300 can be operated purely as a buck converter, which can provide adequate power quality in such cases (whereby first and second output switches 315, 325 can be eliminated). The first and/or second input rectifiers 316, 326 can be provided as active bridgeless rectifiers, passive full-bridge rectifiers, and the like. Switch(es) and inductor(s) can be relocated as needed to accommodate various types of bridgeless power factor correction (PFC) topologies, while still maintaining current path mitigation.

FIG. 4 is a circuit diagram of a power converter 400 including a first converter 410 and a second converter 420 according to an example. Power converter 400 is similar in arrangement and operation to the power converter 300 of FIG. 3. Thus, the first input signal 404 is coupled to the first rectifier 416, which provides rectified input to a first capacitor 411, first inductor switch 413, first inductor diode 434, first inductor 432, first output diode 436, and first output 414. The first inductor switch 413 is to selectively isolate, from the first input signal 404, a first inductor 432 of the first converter 410. The first output switch 415 to selectively isolate the first inductor 432 from the first output 414. The second input signal 405 is coupled to the second rectifier 426, which provides rectified input to a second capacitor 421, second inductor switch 423, second inductor diode 435, second inductor 433, second output diode 437, and second output 424. The second inductor switch 423 is to selectively isolate, from the second input signal 405, a second inductor 433 of the second converter 420. The second output switch 425 is to selectively isolate the second inductor 433 from the second output 424.

In addition to those similar components, power converter 400 includes components to prevent current from circulating through the low side. For example, first source return path switch 417 and first output return path switch 418 are included in the first converter 410, and second source return path switch 427 and second output return path switch 428 are included in the second converter 420. Such switches can be used by a controller to control circulating current on the return paths of the power converter 400, preventing circulating current regardless of what types of input sources are connected to the power converter 400. The control of the first and second converters 410, 420 can be implemented as with the power converter 300 of FIG. 3. However, to prevent circulating currents in the low side, the controller should ensure (e.g., based on the precedence of control functions) that first inductor switch 413, and second source return path switch 427 or second output return path switch 428, are operated exclusively of each other. In a similar manner, second inductor switch 423, and first source return path switch 417 or first output return path switch 418, are operated exclusively of each other.

A controller (not shown in FIG. 4, see controller 330 of FIG. 3) is to prevent the first source return path switch 417 and the second source return path switch 427 from being closed simultaneously, providing exclusive operation of such switches. In an example implementation, the controller can control the power converter 400 to limit a maximum duty cycle on-time of switches 413/417, and 423/427, for each converter to 50%. In such a basic mode, one source 404, 405 would be providing energy at a time, eliminating risk of current circulating between the two sources 404, 405. This example 50% switch mode of operation is described for illustrative purposes, as it would prevent the ability to operate in boost mode, such that power factor corrected current is less than ideal. Other control modes can be used, e.g., based on the precedent of control functions set forth above with respect to FIG. 3. Examples of less ideal, more ideal, and perfect currents are shown in FIG. 5.

Figure 5:
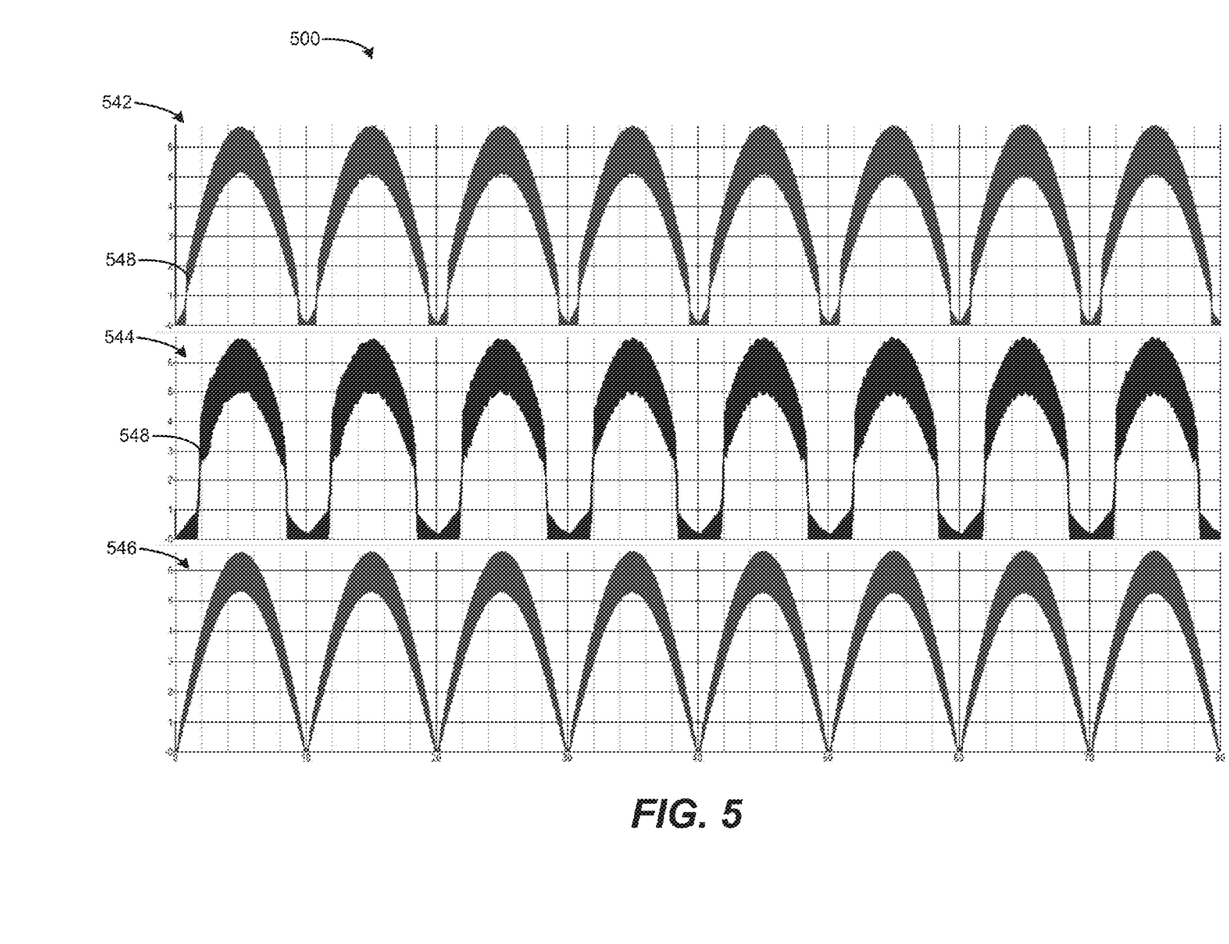
FIG. 5 is a chart depicting current over time for a converter operating at 70%, 50%, and 100% duty cycles.

FIG. 5 is a chart 500 depicting current over time for a converter operating at a maximum of 70% duty cycle 542, a maximum of 50% duty cycle 544, and maximum 100% duty cycle 546. The implications of various duty cycle limits are visible across the illustrated range of duty cycles, e.g., distortion 548 is visible with 50% duty cycle 544, and also visible with 70% duty cycle 542.

The middle graph for 50% duty cycle 544 displays distortion 548 when the converter (e.g., converter 400 of FIG. 4) is operated in boost mode. The upper graph for 70% duty cycle 542 illustrates how the converter can boost to some degree, and the distortion 548 is relatively lower. The lower graph is shown with no limit on the 100% duty cycle 546, and is virtually perfectly sinusoidal.

The distortion in the 50% duty cycle 544 illustrates that when a converter is operating in boost mode, more duty cycle is needed, not less. The ideal 100% duty cycle 546 is not achievable by a converter operating in boost mode, which cannot have a 100% duty cycle. Buck mode operation can have a 100% duty cycle, at which point output equals input. As distortion 548 increases, power factor decreases and harmonic distortion increases.

Figure 6:
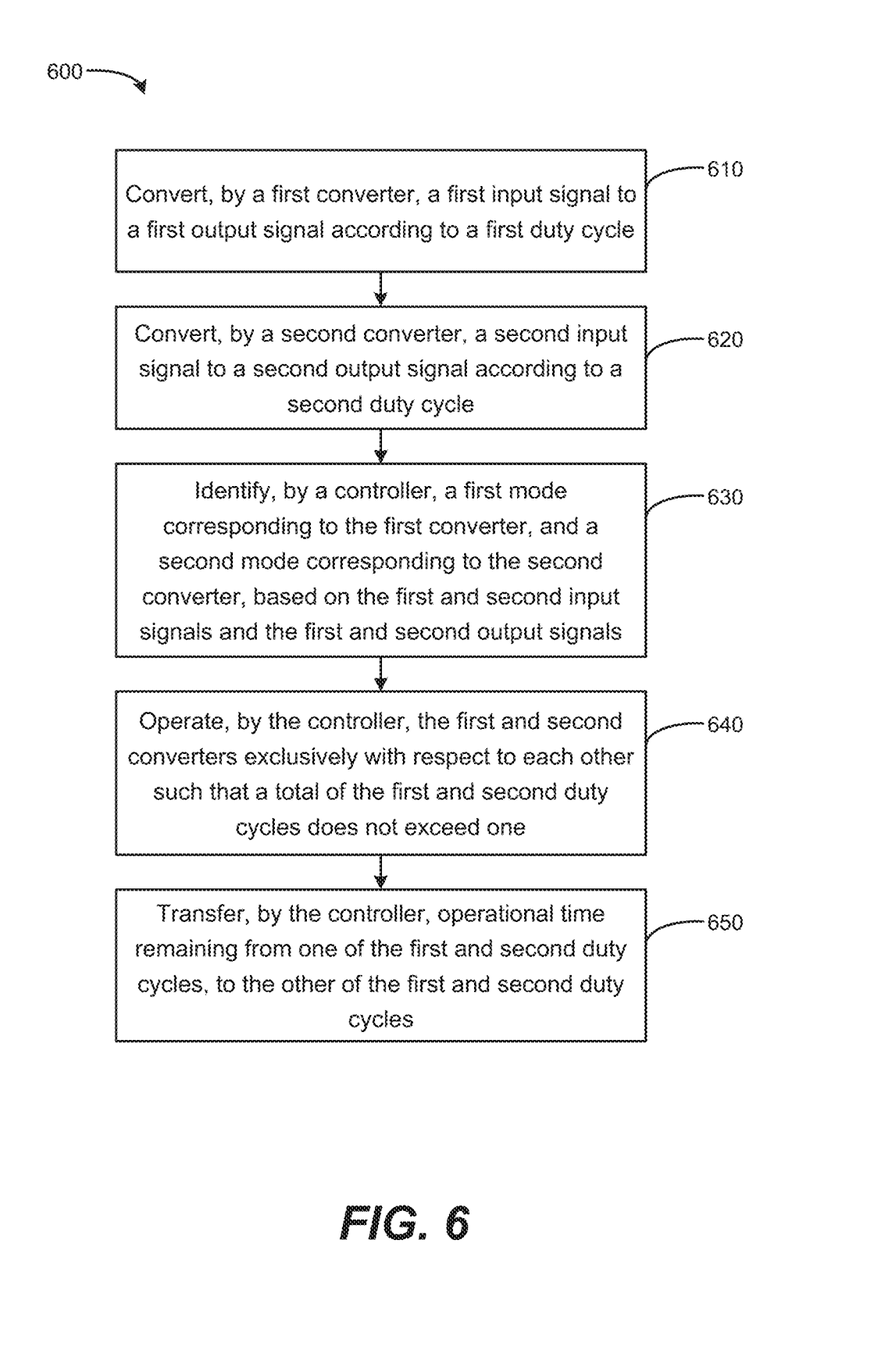
FIG. 6 is a flow chart based on operating first and second converters according to an example.

Referring to FIG. 6, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 6 is a flow chart 600 based on operating first and second converters according to an example. In block 610, a first converter is to convert a first input signal to a first output signal according to a first duty cycle. For example, the first converter can operate in a boost mode to provide an output voltage that increases over time during the first duty cycle. In block 620, a second converter is to convert a second input signal to a second output signal according to a second duty cycle. For example, the first converter can be stopped, and the second converter can be started during the second duty cycle to boost a second input signal to a second output signal. In block 630, a controller is to identify a first mode corresponding to the first converter, and a second mode corresponding to the second converter, based on the first and second input signals and the first and second output signals. For example, the controller can identify that the first mode, of the first controller, is a boost mode, based on the first input having a lower voltage value than the first output. Similarly, the controller can identify that the second mode, of the second converter, is a boost mode.

In block 640, the controller is to operate the first and second converters exclusively with respect to each other such that a total of the first and second duty cycles does not exceed one. For example, the controller can operate the first converter at a 50% duty cycle, and stop the first converter and operate the second converter at the remaining 50% duty cycle. In block 650, the controller is to transfer operational time remaining from one of the first and second duty cycles, to the other of the first and second duty cycles. For example, the controller can identify that the first converter's first output reaches a first threshold prior to using the entire duration of the 50% duty cycle. Upon identifying that the first output of the first converter has reached the first threshold, the controller can stop the first controller (by adjusting a first plurality of switches of the first converter), and start the second converter, thereby transferring unneeded portions of the first duty cycle to the second converter for use during the second duty cycle.

What is claimed is:

1. A power converter comprising:
a first converter to selectively convert a first input signal to a first output signal based on a first plurality of switches and a first duty cycle;
a second converter to selectively convert a second input signal to a second output signal based on a second plurality of switches and a second duty cycle, wherein a first output of the first converter is coupled to a second output of the second converter; and
a controller to control the first and second plurality of switches based on the first and second input signals and the first and second output signals, and based on operating the first and second converters exclusively with respect to each other such that a total of the first and second duty cycles does not exceed one,
identify a first unneeded portion of operational time of the first duty cycle based on checking whether the first output signal has reached a first threshold prior to the end of the first duty cycle;

extend the second duty cycle by adding the first unneeded portion of operational time to the second duty cycle; and transition from the first duty cycle to the second duty cycle.

2. The power converter of claim 1, wherein the controller is to:
identify a second unneeded portion of operational time of the second duty cycle based on checking whether the second output signal has reached a second threshold prior to the end of the second duty cycle;
extend the first duty cycle by adding the second unneeded portion of operational time to the first duty cycle; and
transition from the second duty cycle to the first duty cycle.

3. The power converter of claim 1, wherein the controller is to sense the first and second input signals and the first and second output signals; and control the first and second plurality of switches based on the first and second duty cycles and based on first and second modes according to the sensed first and second input and output signals.

4. The power converter of claim 1, wherein the controller is to identify a loss of either the first input signal or the second input signal, and in response, remove a duty cycle limit from a corresponding remaining one of the first and second converters receiving an input signal.

5. The power converter of claim 1, wherein the controller is to identify a loss of either the first input signal or the second input signal, and in response, increase output voltage to a level suitable for providing a full holdup time.

6. The power converter of claim 1, wherein the first plurality of switches includes a first inductor switch to selectively isolate, from the first input signal, a first inductor of the first converter; and a first output switch to selectively isolate the first inductor from the first output;
wherein the second plurality of switches includes a second inductor switch to selectively isolate, from the second input signal, a second inductor of the second converter; and a second output switch to selectively isolate the second inductor from the second output; and
wherein the controller is to prevent the first inductor switch and the second inductor switch from being closed simultaneously.

7. The power converter of claim 5, wherein the controller is to identify a second mode as either a boost mode or a buck mode,
wherein the controller is to identify the second mode as a boost mode based on a rectified potential of the second input signal being below a voltage of the second output signal, and close the second inductor switch and the second output switch to charge the second inductor during the second duty cycle and open the second output switch and the first output switch to direct the output signal to the first and second output during the second duty cycle; and
wherein the controller is to identify the second mode as a buck mode based on a rectified potential of the second input signal being above the voltage of the second output signal, and close the second inductor switch and open the second output switch to feed the first and second output during the second duty cycle and open the second inductor switch to isolate the second inductor from the second input signal and allow the output signal to freewheel through a second inductor diode during the second duty cycle.

8. The power converter of claim 1, wherein the first plurality of switches includes a first source return path switch and a first output return path switch to selectively isolate, from the first input signal, a first inductor of the first converter; and a first output switch to selectively isolate the first source from the first output;
wherein the second plurality of switches includes a second source return path switch to selectively isolate, from the second input signal, a second inductor of the second converter; and a second output return path switch to selectively isolate the second source from the second output; and
wherein the controller is to prevent the first source return path switch and the second source return path switch from being closed simultaneously.

9. The power converter of claim 5, wherein the controller is to identify a first mode as either a boost mode or a buck mode,
wherein the controller to identify the first mode as a boost mode based on a rectified potential of the first input signal being below a voltage of the first output signal, and close the first inductor switch and the first output switch to charge the first inductor during the first duty cycle and open the first output switch and the second output switch to direct the output signal to the first and second output during the first duty cycle; and
wherein the controller is to identify the first mode as a buck mode based on a rectified potential of the first input signal being above the voltage of the first output signal, and close the first inductor switch and open the first output switch to feed the first and second output during the first duty cycle and open the first inductor switch to isolate the inductor from the first input signal and allow the output signal to freewheel through a first inductor diode during the first duty cycle.

10. A power converter comprising:
a first converter to selectively convert a first input signal to a first output signal based on a first rectifier, a first plurality of switches, and a first duty cycle;
a second converter to selectively convert a second input signal to a second output signal based on a second rectifier, a second plurality of switches, and a second duty cycle, wherein a first output of the first converter is coupled to a second output of the second converter; and
a controller to identify a first mode, corresponding to the first converter, and a second mode, corresponding to the second converter, based on the first and second input signals and the first and second output signals, and control the first and second plurality of switches based on the first and second modes and based on operating the first and second converters exclusively with respect to each other such that a total of the first and second duty cycles does not exceed one and such that the controller is to transfer operational time, remaining from one of the first and second duty cycles, to the other of the first and second duty cycles
identify a first unneeded portion of operational time of the first duty cycle based on checking whether the first output signal has reached a first threshold prior to the end of the first duty cycle;
extend the second duty cycle by adding the first unneeded portion of operational time to the second duty cycle; and
transition from the first duty cycle to the second duty cycle.

11. The power converter of claim 10, wherein at least one of the first and second rectifiers is an active bridgeless rectifier.

12. The power converter of claim 10, wherein at least one of the first and second rectifiers is a passive full bridge rectifier.

13. A method, comprising:
converting, by a first converter, a first input signal to a first output signal according to a first duty cycle;
converting, by a second converter, a second input signal to a second output signal according to a second duty cycle;
identifying, by a controller, a first mode corresponding to the first converter, and a second mode corresponding to the second converter, based on the first and second input signals and the first and second output signals;
operating, by the controller, the first and second converters exclusively with respect to each other such that a total of the first and second duty cycles does not exceed one; and
transferring, by the controller, operational time remaining from one of the first and second duty cycles, to the other of the first and second duty cycles,
wherein the controller is to identify the operational time remaining based on at least one of i) whether the first output signal has reached a first threshold prior to the end of the first duty cycle, or ii) whether the second output signal has reached a second threshold prior to the end of the second duty cycle.

* * * * *